June 6, 1950  W. O. NIXON  2,510,830
METHOD AND APPARATUS FOR PRODUCING SPIRAL BROACHES
Filed Oct. 18, 1945  3 Sheets-Sheet 1

*INVENTOR.*
WILLIAM O. NIXON
BY
ATTORNEYS

June 6, 1950 W. O. NIXON 2,510,830
METHOD AND APPARATUS FOR PRODUCING SPIRAL BROACHES
Filed Oct. 18, 1945 3 Sheets-Sheet 2

INVENTOR.
WILLIAM O. NIXON
BY

ATTORNEYS

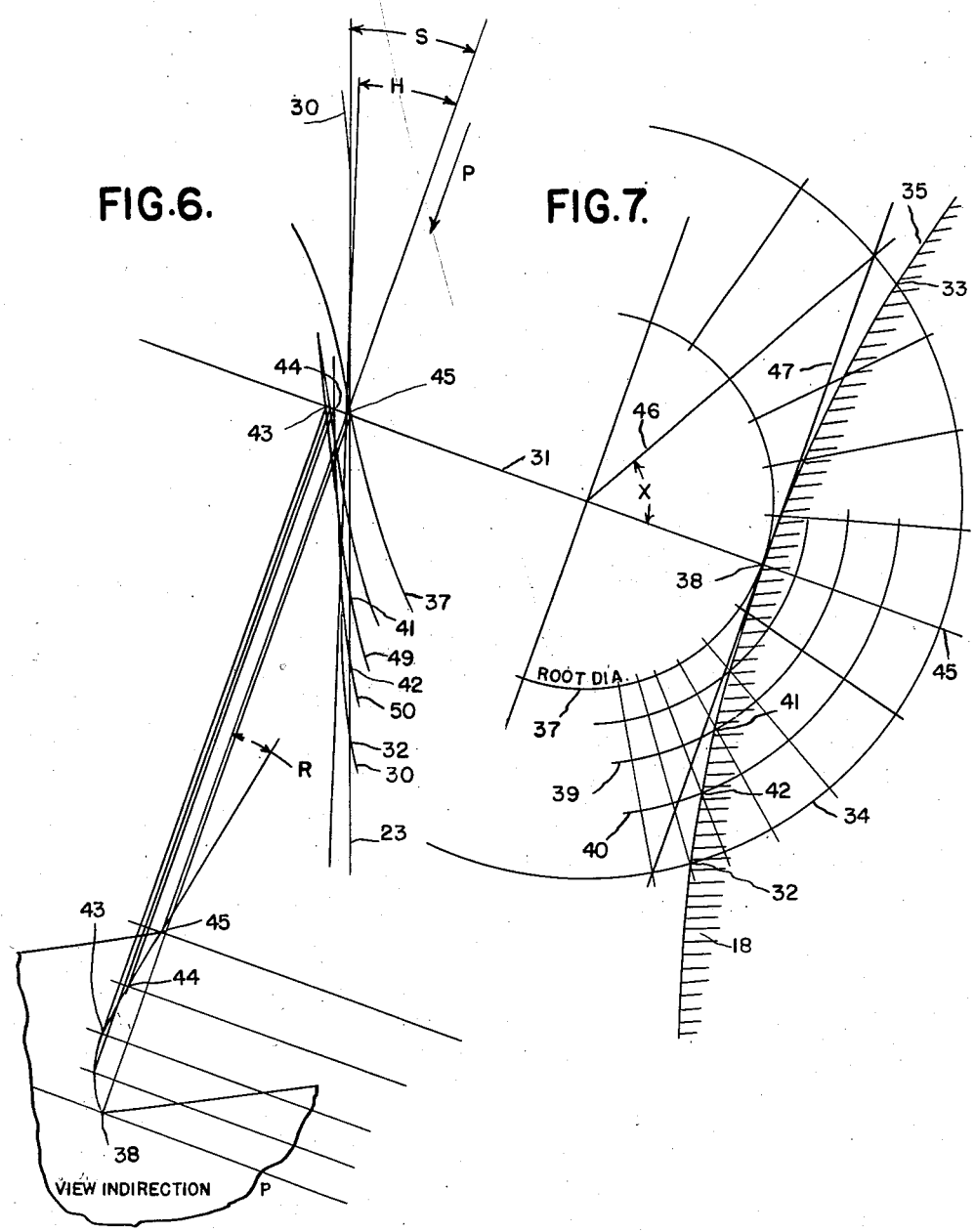

Patented June 6, 1950

2,510,830

UNITED STATES PATENT OFFICE 2,510,830

METHOD AND APPARATUS FOR PRODUCING SPIRAL BROACHES

William O. Nixon, East Detroit, Mich., assignor, by mesne assignments, to Turner Bros. Inc., Ferndale, Mich.

Application October 18, 1945, Serial No. 622,975

5 Claims. (Cl. 51—71)

This invention relates generally to broaches and refers more particularly to broaches having helical teeth.

In instances where it is desirable or essential to broach round holes with a shearing cut, a broach is advantageously employed having a continuous helical tooth provided with a face or rake angle which is positive and varies in dependence upon the characteristics of the metal to be cut. In order to grind a helical tooth on a broach with a positive rake angle at the cutting edge, it is essential to reach back of the cutting edge of the tooth with the peripheral portion of the grinding wheel in a manner to avoid contact of the wheel with the cutting edge of the broach tooth. This is usually accomplished by using a small grinding wheel in comparison to the diameter of the broach and in tilting the grinding wheel to take advantage of the sharp radius of the periphery of the wheel. The difficulty in accomplishing this operation increases as the diameter of the broach decreases, and in cases where the diameter of the broach is one inch or less, very little clearance is available for the griding wheel. In fact, it has been considered impractical in the past to grind helical teeth on a small diameter broach with an undercut, because the size of the grinding wheel permissible is so small as to make it practically impossible to maintain a sharp and free cutting edge on the wheel.

It is an object of this invention to overcome the above difficulties by providing a method and apparatus for manufacturing spiral broaches of practically any size with helical teeth having a positive rake or face angle. In accordance with this invention, spiral broaches as small as .020 of an inch in diameter may be ground with a positive rake angle at the cutting edge while employing wheels of substantial diameter. In fact, the diameter of the wheel used is not restricted by the diameter of the broach. The result is that wheels may be used which will retain their cutting accuracy over a long period of use with infrequent dressing.

The foregoing as well as other objects will be made more apparent as this description proceeds, especially when considered in connection with the accompanying drawings, wherein:

Figure 6 is a diagram showing a development of one of the broach teeth;

Figure 7 is a diagram of the broach tooth face from which Figure 6 was projected; and Figure 8 is also a diagram projected from Figure 6.

Figure 1:
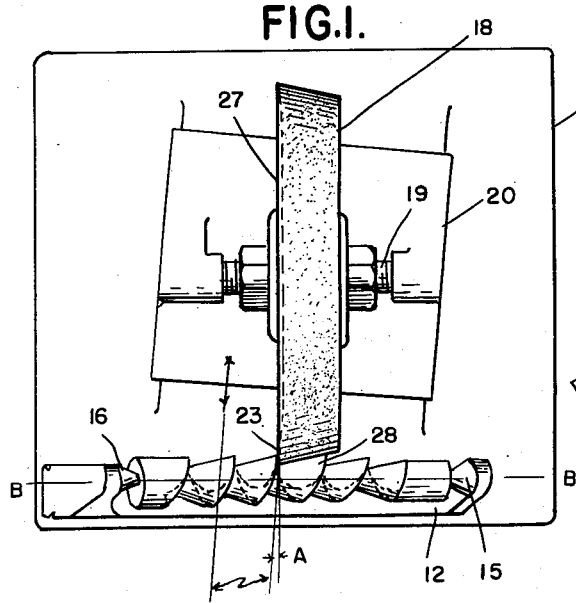
Figure 1 is a diagrammatic plan view of suitable grinding apparatus for fashioning a spiral broach in accordance with this invention.

The method of producing broaches having helical teeth with a positive rake angle at the cutting edge will be more fully understood from a brief description of the apparatus employed to carry out the various steps of the method. However, it will be noted as this description proceeds that the method may be practiced with various different types of apparatus and is by no means limited to the particular equipment shown in the drawings.

Figure 2:
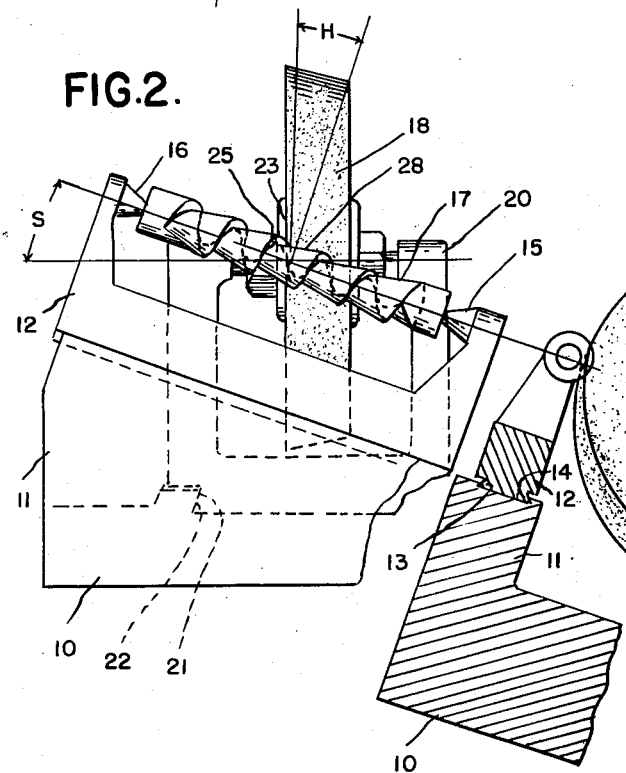
Figure 2 is a side elevational view of the apparatus shown in Figure 1.
Figure 3:
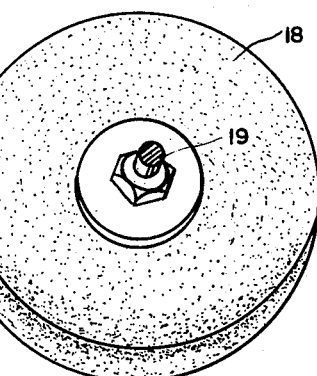
Figure 3 is a fragmentary sectional view of a part of the apparatus.

With the foregoing in view, reference is now made more in detail to Figures 1 to 3 inclusive of the drawings. In detail, the reference character 10 indicates a suitable base having an upwardly projecting inclined portion 11 at one edge for supporting a slide 12. The bottom of the slide 12 is fashioned to form a dovetail 13 which extends for the full length of the slide and slidably engages in a correspondingly shaped recess 14 formed in the top surface of the portion 11. One end of the slide 12 is provided with a center 15 and the opposite end of the slide carries a cooperating center 16 aligned with the center 15. The two centers cooperate to rotatably support a work blank or a broach 17 to be ground and the center 16 is supported in a suitable manner (not shown) on the slide for adjustment toward and away from the center 15. During grinding of the broach 17, the latter is rotated relative to the slide 12 and the slide is synchronously fed laterally relative to the grinding wheel by mechanism which forms no part of this invention and is accordingly not shown herein.

The base 10 also supports a grinding wheel 18 on similar slide designed for movement toward and away from the broach 17. The grinding wheel is secured in the usual manner to a rotatable shaft 19 having the opposite ends journalled on a carriage 20 and rotatable at the desired speed by any suitable mechanism not shown herein. The carriage 20 is guided to and from the broach 17 by a dovetail projection 21 on the bottom of the carriage and a correspondingly shaped groove 22 formed in the top surface of the base 10. In actual practice, the carriage with the grinding wheel thereon is slidable back and forth along a path extending at an angle to a plane B—B, including the axis of the broach or centers 15 and 16. This angle is indicated in Figure 1 of the drawings by the character A and is sufficient to provide ample clearance between the tooth 25 on the broach and the cutting edge 23 of the wheel upon withdrawing the wheel from the broach.

Figure 4:
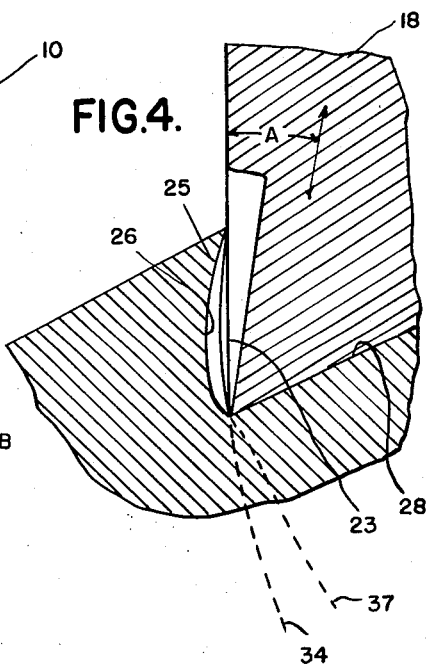
Figure 4 is an exaggerated fragmentary sectional view showing a portion of a grinding wheel in operative relation to a part of the broach.

Although the path of sliding movement of the grinding wheel is inclined with respect to the plane B—B of the broach for the purpose set forth, nevertheless, the axis of rotation of the grinding wheel or shaft 19 lies in a plane parallel to the plane B—B. However, as shown in Figure 2 of the drawings, the axis of the broach is inclined in the plane B—B with respect to the axis of the grinding wheel at an angle S which is necessarily greater than the helical angle H of the spiral tooth 25 on the broach. The above relative position of the broach and grinding wheel is important since it provides for grinding the face of the tooth along the line indicated in Figure 4 of the drawings by the reference character 26 and imparts a positive rake to the cutting edge of the tooth 25.

When the broach is supported by the centers on the angle indicated by the character S, an interference ordinarily develops between the grinding wheel 18 and the cutting face of the tooth 25 on the broach. This interference usually takes place at the outside diameter of the tooth and results in destroying the cutting edge as well as the rake on the tooth. In order to overcome this objection, the face 27 of the grinding wheel 18 adjacent the cutting edge is dished at an angle indicated by the character A. In other words, the face 27 of the grinding wheel 18 occupies a plane parallel to the path of travel of the carriage 20. The angle A may be relatively small and need not exceed five degrees. The periphery of the grinding wheel 18 is dressed or otherwise formed to taper inwardly from the cutting edge 23 and conform to the desired clearance face or flank 28 of the tooth to be formed.

Figure 5:
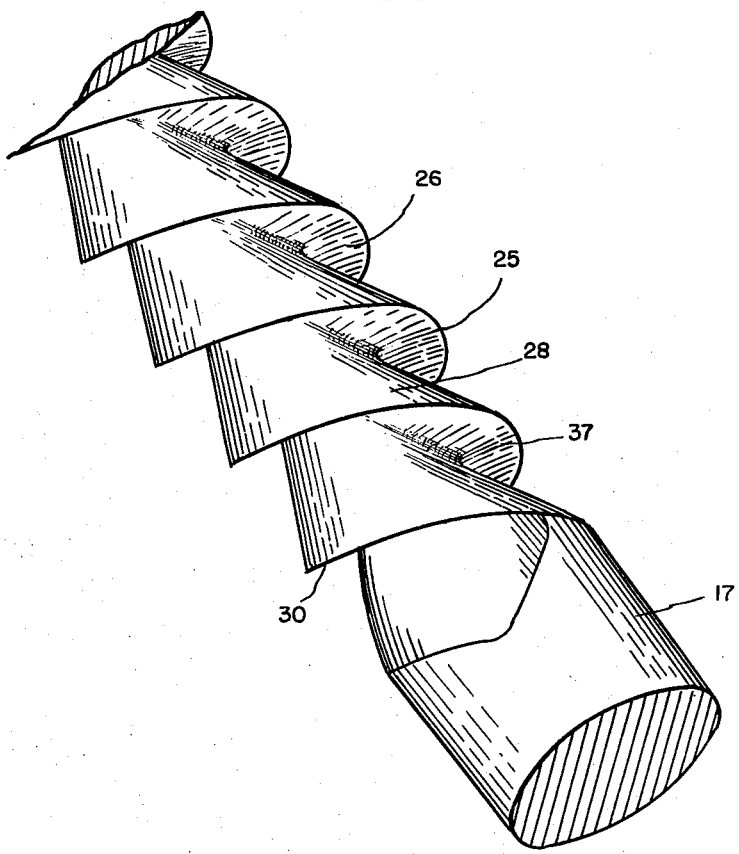
Figure 5 is a perspective view of a part of the broach forming the subject matter of this invention.

Figure 5 of the drawings illustrates an exaggerated view of a typical sixteen pitch double lead broach having a diameter of one-eighth of an inch and having a helical angle H of seventeen degrees, forty minutes. The desired rake angle of the cutting face of the helical tooth is approximately a positive eight and one-half degrees. This rake angle is obtained by setting the broach at an angle in the plane B—B of nineteen degrees, forty mintues relative to the axis of the grinding wheel 18.

With the above in view, reference is now made to Figures 6, 7 and 8 of the drawings, wherein the line 30 indicates the helix curve of the outside edge of the broach tooth. The curve crosses the center line 31 of the broach at the true helical angle H, which is 17° 40′ in this case. The maximum angle S is derived between the points 32 and 33, where the periphery of the broach 34 intersects the periphery 35 of the grinding wheel. In this case, we are not using the maximum angle. The line 37 shows the helical curve at the root of the broach tooth. The periphery 35 of the grinding wheel contacts the line 37 at the point 38 only, shown in Figure 7 of the drawing. The lines 49 and 50 are helical curves at intermediate diameters 39 and 40, respectively, on the tooth face which come in contact with the periphery 35 of the grinding wheel at the points 41 and 42, respectively. As the broach is rotated and synchronously fed in the manner previously stated, the points 41 and 42 move laterally and rotatively to the points 43 and 44, respectively, in the same manner as the point 32 moves to point 45. This action provides the undercut or positive rake shown in Figures 4 and 8 of the drawings.

The angle S may be approximated by the formula $$\text{Tan } S = \frac{2L}{\text{sine of angle } x} \times \frac{x}{360°}$$

where L is the lead of the broach tooth per broach diameter and angle X (shown in Figure 7 of the drawings) is the acute angle between the center line 31 of the broach and the line 46. The line 47, although shown as a straight line, is considered for calculating purposes the periphery of the grinding wheel, and the line 46 extends from the geometric center of the broach to the point of intersection between the periphery 34 of the broach and the line 47.

The angle $x$ may be determined by the formula $$\text{Cos of angle } x = \frac{1 - 2D}{2}$$

where D is the depth of the broach tooth per inch diameter. The depth of the broach tooth per inch diameter (D) may be approximated by the formula $$D = \frac{39.5 \tan^2 \text{ of rake angle required}}{L^2 \; 39.5 \tan^2 \text{ of rake angle}}$$

The rake angle formed on the broach tooth by setting the broach at the angle S may be determined by the formula $$\text{Positive rake} = \frac{\tan S \text{ secant } x - \tan H}{\tan x}$$

where H is the true helical angle of the broach tooth and may be determined by dividing the lead per inch of broach diameter by pi or 3.1416.

The arrangement is such as to enable accurately grinding a small diameter broach with a helical tooth having a positive rake and enables broaching a hole with a shearing cut to very close tolerances. Owing to the specified relationship between the broach and axis of the grinding wheel during the grinding operation, the helical tooth is undercut to provide the required positive rake angle with a grinding wheel of substantial diameter. Grinding wheels having diameters of 12, 18, 24 or more inches may be successfully used on broaches as small as .020 diameter. The ratio between the small diameter broach and the relatively large diameterg rinding wheel is so great that the cutting edge 23 of the wheel passing through the broach teeth forms substantially a straight line. This feature contributes to the accuracy of the broach and renders it possible to maintain the cutting edge of the wheel over a long period of use.

What I claim as my invention is:

1. The method of forming a broach with a helical tooth having an oblique flank and a face with a positive rake from the cutting edge thereof; comprising arranging a rotary dished grinder wheel and broach stock in intersecting relation to each other with their respective axes of rotation in parallel planes but crossing at an oblique angle to each other, the peripheral surface of said grinder wheel being at an oblique angle to its axis and the axis of the broach stock to fashion the flank of the tooth and the dished surface of the wheel being opposite the rake face of the tooth to provide clearance for the cutting edge thereof, and advancing said broach stock helically about its axis with respect to said grinder wheel.

2. The method of forming a broach with a helical tooth having an oblique flank and a face with a positive rake from the cutting edge thereof; comprising arranging a rotary dished grinder wheel and broach stock with their respective axes of rotation in parallel planes but crossing at an oblique angle to each other, the peripheral surface of said grinder wheel being at an oblique angle to its axis and the axis of the broach stock to fashion the flank of said tooth and the dished surface of said wheel being opposite the rake face of said tooth to provide clearance for the cutting edge thereof, relatively moving said grinder wheel and broach stock into or out of engagement with each other through a path which is at a slight angle to a plane perpendicular to the aforesaid planes, advancing said broach stock helically about its axis with respect to said grinder wheel when in full engagement with the latter, whereby the peripheral edge portion of said grinder wheel will cut the rake in the face of the tooth without interference with the cutting edge thereof.

3. The method of forming a broach with a helical tooth having an oblique flank and a face with a positive rake from the cutting edge thereof; comprising arranging a rotary dished grinder wheel and broach stock in intersecting relation to each other with their respective axes of rotation in parallel planes but crossing at an oblique angle to each other which is somewhat greater than the helix angle of the tooth to be formed, the peripheral surface of said grinder wheel being at an oblique angle to its axis and the axis of the broach stock to fashion the flank of the tooth and the dished surface of the grinder wheel being opposite the rake face of the tooth to provide clearance for the cutting edge thereof, and advancing the broach stock helically about its axis with respect to the grinder wheel, whereby the peripheral portion of said grinder wheel will cut the rake in the face of the tooth, without interference with the cutting edge of said tooth.

4. Apparatus for forming a broach wth a helical tooth having a positive rake angle in the face thereof; comprising a dished grinder wheel, means rotatably supporting a length of stock from which a broach is to be formed with its axis of rotation located in a plane parallel to a plane having the axis of rotation of the grinder wheel therein, said axes crossing at an oblique angle to each other, and the peripheral portion of said wheel intersecting said broach stock, and means for advancing said broach stock helically about its axis with respect to said grinder wheel and towards the dished surface thereof, whereby the peripheral edge portion of the grinder wheel will cut the rake in the face of the tooth without interference with the cutting edge thereof.

5. Apparatus for forming a broach with a helical tooth having a positive rake angle in the face thereof; comprising a base, a dished grinder wheel and a holder for a length of broach stock mounted on said base with the axis of rotation of said grinder wheel and the longitudinal axis of the broach stock respectively arranged in spaced parallel planes and crossing at an oblique angle to each other, a carriage for advancing said broach stock holder and broach stock to move the latter helically about its axis and towards the dished surface of said grinder wheel when in engagement therewith to develop the helical tooth, and a carriage for moving said grinder wheel at a slight angle to its plane of rotation into and out of intersecting engagement with said broach stock, thereby avoiding interference with the cutting edge of said tooth.

WILLIAM O. NIXON.

REFERENCES CITED

The following references are of record in the file of this patent:

UNITED STATES PATENTS

| Number | Name | Date |
|---|---|---|
| 230,715 | Penney | Aug. 3, 1880 |
| 1,233,543 | Benicke | July 17, 1917 |
| 1,275,218 | Calkins | Aug. 13, 1918 |
| 1,339,657 | Lapointe | May 11, 1920 |
| 1,473,086 | Davidson | Nov. 6, 1923 |
| 1,659,226 | Wildhaber | Feb. 14, 1928 |
| 1,662,078 | Severson | Mar. 13, 1928 |
| 1,669,887 | Wildhaber | May 15, 1928 |
| 1,722,023 | Streby | July 23, 1929 |
| 1,867,213 | Douglas | July 12, 1932 |
| 1,881,705 | Lapointe | Oct. 11, 1932 |
| 2,048,520 | Schurr | July 21, 1936 |
| 2,162,758 | Shotey | June 20, 1939 |
| 2,217,045 | Faulder | Oct. 8, 1940 |
| 2,292,900 | Schmidt | Aug. 11, 1942 |

FOREIGN PATENTS

| Number | Country | Date |
|---|---|---|
| 4,068 | Great Britain | Feb. 17, 1911 |
| 222,937 | Great Britain | Oct. 7, 1924 |
| 547,347 | France | Sept. 20, 1922 |